Dec. 25, 1956 W. P. MASON ET AL 2,775,650

FERROELECTRIC RECORDING AND REPRODUCTION OF SPEECH

Filed Dec. 31, 1954 2 Sheets-Sheet 1

INVENTORS: W. P. MASON
R. N. THURSTON
BY H. O. Wright
ATTORNEY

FERROELECTRIC RECORDING AND REPRODUCTION OF SPEECH

Filed Dec. 31, 1954 2 Sheets-Sheet 2

INVENTORS: W. P. MASON
R. N. THURSTON

BY H. O. Wright
ATTORNEY

United States Patent Office 2,775,650

Patented Dec. 25, 1956

2,775,650

FERROELECTRIC RECORDING AND REPRODUCTION OF SPEECH

Warren P. Mason, West Orange, and Robert N. Thurston, Whippany, N. J., assignors to Bell Telephone Laboratories, Incorporated, New York, N. Y., a corporation of New York Application December 31, 1954, Serial No. 479,208

9 Claims. (Cl. 179—100.1)

This invention relates to methods and apparatus for recording and reproducing electrical signals of a continuous wave character, both within the audible frequency range and over a broad band of frequencies extending up to twenty megacycles or more.

As is well known to those skilled in the art, speech and other more or less complex continuous wave audible frequency range signals have been recorded and reproduced for some years by systems utilizing magnetic tape, the signals being recorded in the form of variations of a remanent polarization pattern impressed along the tape. Such recordings have, however, usually been limited to signals involving maximum frequencies in the order of four megacycles for television signals.

The superficial analogy between the polarization properties of ferromagnetic materials and those of recently developed ferroelectric materials of numerous and varied compositions have led many skilled technicians to attempt to devise recording and reproducing systems which would utilize a remanent polarization pattern impressed along a path in a ferroelectric material. Success has, however, heretofore been limited to the recording and reproduction of discrete pulses, as disclosed, for example, in application Serial No. 254,245, filed November 1, 1951, by J. R. Anderson, assignor to applicant's assignee. This application issued as Patent 2,717,372 on September 6, 1955.

A principal impediment to the successful operation of such systems as have been heretofore proposed for the recording and reproduction of speech and other continuous wave signals in ferroelectric media is the tendency of a static surface charge to collect on the surface of the ferroelectric material, which charge has the effect of substantially canceling, or masking, the external electric field representing the stored signal.

Accordingly, it is the general object of the present invention to provide practical, operative methods and systems for the recording and reproduction of speech and other continuous wave signals, said methods and systems employing ferroelectric storage media.

A more particular object is to overcome the deleterious effects of surface charges on ferroelectric storage media.

Another specific object of the invention is to provide systems in which a large quantity of signal information can be recorded on a very restricted area of the storage medium.

A still further object is the recording and reproduction of pluralities of multichannel carrier frequency telephone and telegraph signals and also of television, video, and audio signals of numerous and varied types.

These and other objects are attained in the systems of the present invention. These systems utilize as a recording medium a ferroelectric material, preferably, by way of example, a thin film of barium titanate on a conducting substrate. Voice frequency, carrier frequency and/or video frequency signals are recorded in the ferroelectric film as variations in the remanent polarization pattern. The recorded signals are recovered as modulations of a carrier wave impressed across the record.

One of the outstanding advantages of the systems of the present invention is that they make possible the successful recording and subsequent reproduction of an extremely broad-band frequency range, reaching from zero well into the megacycle frequency range. It will be apparent to those skilled in the art that such a broad-band characteristic is inherently adapted for many important recording applications relating to carrier telephone, radio, and television signals. For example, such a broad-band characteristic could readily accommodate several thousand carrier telephone channels simultaneously, or alternatively, several television video signal channels.

In preferred form, the recording medium is a layer, or thin film, of barium titanate from a half micron to a few microns thick, evaporated onto a platinum or palladium substrate, which latter need be only a few microns thick, and serves to orient the electrical domains of the barium titanate film so that they are all aligned in substantially the same direction. The thin substrate layer of platinum or palladium is, of course, first applied to an additional conducting substrate of copper or brass, for example, to provide the necessary stiffness, and thereafter the film of barium titanate is deposited. An alternative form of recording medium is a polycrystalline ferroelectric ceramic layer which is baked onto a conducting substrate, and thereafter ground to a film of the desired thickness of from one-half to a few microns.

A ferroelectric recording matrix of either of the types described above can be utilized in a number of alternative forms, such as flexible tape, or as a conventional recording disk. It can also be of cylindrical form, as chosen for the illustrative embodiment to be described in detail hereinafter. In this embodiment, it takes the form of a hollow cylindrical sleeve having a thin layer of ferroelectric material on its external surface. This cylindrical sleeve is mounted on a drum which is driven to rotate, and the over-all recording and reproducing mechanism is similar in many respects to the Edison phonograph employing cylindrical records, which was popular half a century ago.

For recording, a signal varied voltage is impressed between the conductive substrate or substrates of the film and a contacting element riding in a helical path on the surface of the ferroelectric layer. As will be discussed hereinafter, the contacting element passes over the surface of the medium, causing variations in the remanent polarization which correspond to the applied signal voltage variations.

For recovering or reproducing the recorded signals, the polarized record, mounted on the same, or a similar mechanism, is rotated with respect to a contacting element which is moved along the helical path of the recorded polarization pattern at substantially the recording rate. A carrier wave source is included in the circuit which connects the contacting element and the conducting substrate. As successive variations in the remanent polarization of the ferroelectric film are contacted, they cause corresponding variations in the reactance of the circuit. This produces modulations on the impressed carrier wave which can be readily demodulated by conventional means such as rectification, filtering, or the use of a large capacitor shunted across the output. In instances where, for example, a plurality of carrier frequency communication channels, either audio or video or both, have been recorded, further filtering and demodulating steps can obviously be carried out by means well understood by those skilled in the art, to recover the signal information of each such channel, severally.

A further particular feature of the present invention which will be explained in detail hereinunder, is the amplification which is realized in the reproducing circuit, whereby the recovered output signal is substantially enhanced in volume relative to the recorded input signal. This renders practicable the reproduction of information recorded on a much smaller surface area than has heretofore been considered practicable with any type of recording media. Moreover, since the energy does not spread sidewise in the medium of the present invention, separations between recorded areas can be made extremely small. For example, using the techniques illustrated in the drawings and described in detail hereinafter, it may be possible to record speech and other continuous wave signals on lines as thin as a mil, having a mil separation between, thus making possible records in which the "playing time" is increased by as much as a factor of ten over those in current use. This feature, coupled with the above-described inherent broadband characteristic of the system, makes possible a tremendous increase in the amount of information which can be stored in a given recording area.

These and other objects and features will be better understood from a detailed study of the specification hereinafter with reference to the attached drawings, in which.

Certain crystalline materials, when exposed to an alternating polarizing voltage, exhibit a relationship between the electrostatic polarizing force and the polarization in the direction of the applied force which is similar to the hysteresis loops exhibited by magnetic materials. Such crystalline materials, of which barium titanate is an outstanding example, are called "ferroelectrics."

Figure 1:
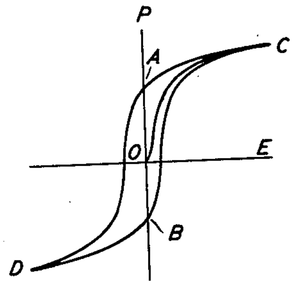
Fig. 1 is a graph showing a typical hysteresis curve for a ferroelectric crystalline material, such as barium titanate.

A hysteresis loop produced by application of a sixty cycle per second alternating voltage across a typical crystal of barium titanate is shown in Fig. 1 of the drawings, wherein field strength E, applied through the thickness of the crystal, is plotted against the consequent polarization P of the crystal.

Starting from the zero field and polarization at point O, the curve rises to the right, at first gradually, then rapidly, and finally slopes asymptotically to saturation at point C. Removal of the positive field now allows the polarization to fall to a positive value at A, which is called the remanent polarization. To remove the latter, i. e., to reduce it to zero, negative field must be applied. The magnitude of this field, which is called the coercive force, depends on the pretreatment of the crystal. By analogy to the hysteresis loop characterizing ferromagnetic materials, the remainder of the complete loop CADBC is obtained.

It is this "hysteresis" characteristic exhibited by ferroelectric materials which makes them suitable media for the recording of speech and other complex signals, in accordance with the principles of the present invention.

In the illustrative embodiment of the present invention, which will now be described in detail, barium titanate has been selected as the ferroelectric crystalline recording material. In a preferred form, the recording matrix is prepared by evaporating barium titanate crystals at a temperature of about 1,700 degrees centigrade in a vacuum onto a substrate of platinum or palladium. As pointed out earlier in the specification, the latter need only be a few microns thick, and may be superposed on copper or some other conducting base to give the combination the desired stiffness. The aforesaid evaporating process may, for example, cause the formation of a film of barium titanate a half-micron thick, which is subsequently heat-treated in air at a temperature of between 500 and 600 degrees centigrade for an interval of approximately ten minutes. Such a film is described by Charles Feldman in Abstract 5, American Physical Society Bulletin, vol. 29, No. 5, June 28, 1954.

X-ray difraction examination of films made in the manner described show that the structure is mainly perovskite, with the hexagonal face as a minor constituent. Dielectric and hysteresis measurements show that such a film exhibits a Curie temperature at about 120 degrees centigrade, and has a room temperature dielectric constant of the order of 100. Because of their small thicknesses, and because of the orienting effect of the platinum or palladium substrate, barium titanate films of the type described are almost completely polarized during the process of preparation. The polarization may be readily changed by the application of small voltages. Using such thin films, it is possible to produce recording lines of one one-thousandth of an inch or less in thickness. Furthermore, it is possible to space successive recording lines less than one one-thousandth of an inch apart without encountering interference between them. This may be explained by the fact that the domain walls in a barium titanate crystalline film do not move sidewise with facility and hence, the polarization does not extend in a sidewise direction.

As pointed out hereinbefore, the characteristics of a barium titanate film evaporated onto a platinum or palladium substrate, or the alternative film produced by baking a coating of crystalline barium titanate on a conducting substrate and grinding to the desired thickness, make possible the storage of a large amount of information in a small space, which information can be recovered with appreciable amplitude. Another advantage of the barium titanate film as compared with magnetic tape or any other prior art recording media, is that signals having an upper frequency limit of twenty megacycles or more can be readily recorded and reproduced. The upper frequency limit is substantially inversely proportional to the thickness of the barium titanate film, and also to the applied voltage and varies with the temperature, as indicated in Fig. 10 on page 1609 of the article entitled "Ferroelectrics and the dielectric amplifier" by Mason and Wick, "Proceedings of the I. R. E.," volume 42, No. 11, November 1954.

The alternative speech or continuous wave signal recording medium of this invention, produced by baking a ceramic layer comprising ferroelectric crystals onto any kind of a conducting substrate, may be prepared in the form of a thin sheet such as described, for example, in Patent 2,582,993 issued to G. N. Howatt, January 22, 1952. Silver paste is baked onto one surface of the flexible sheet of ceramic which is then secured by soldering to a surface of the desired shape, such as the cylindrical sleeve 11 of Fig. 3A, to be described hereinafter. After baking, the ceramic coating is ground down to the desired thickness of a few microns.

Figure 2:
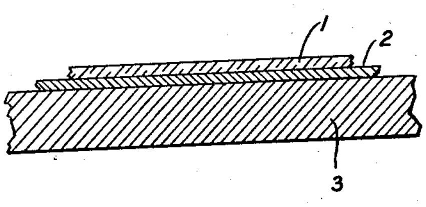
Fig. 2 is a cross-sectional view of a recording medium on the conducting substrate in accordance with the present invention.

Fig. 2 shows a cross-sectional view of a portion of a recording matrix of the type described above. This comprises a crystalline coating of barium titanate 1 having a thickness of from one-half micron to a few microns superposed on a conducting substrate 2, preferably of platinum or palladium. As pointed out previously in the specification, the substrate 2 need only be a few microns thick, firm support being provided by a conducting base member 3 of, for example, copper. As is also mentioned previously, the ferroelectric recording matrix described above is adaptable for use in any of the forms well known in the art, such as flexible tape, or a thin disk, as alternatives to the cylindrical sleeve 11, which is specifically designed for use with a rotating drum-type recording-reproducing system of the general type shown in Fig. 3A of the drawings. The latter is merely illustrative of one of the many types of recording-reproducing systems, well known in the art, which can be adapted to carry out the novel concepts of the present invention.

The sleeve 11, upon which is superposed a thin layer of platinum or palladium and an outer thin film of barium titanate, is removably fitted onto a rotatable drum 10, which may assume the form of a hollow metallic cylinder having a metal framework at each end, at the center of which is disposed a socket. The socket 13*a* on one end is designed to rigidly engage the shaft 13, which is mounted in a bearing in the vertical supporting member 15. The socket at the other end is designed to fit onto and rotate about the end of a threaded stud 13*b*. The stud screws into place in the vertical supporting member 16, and is firmly held by lock nuts on both sides. Such an arrangement facilitates the removal of the drum 10 for placement of the sleeve 11 thereon for a recording or reproducing operation, or for the removal of the sleeve 11 following the completion of an operation.

Supported by, and rolling on the sensitive surface of the sleeve 11, is a spherical contacting member 25, mounted in a plastic housing 21, the housing 21 and member 25 being driven to move laterally from left to right by rotation of the threaded rod 22 which passes through the internally screw-threaded opening 23 in the housing 21, the thread of the opening 23 fitting that of rod 22. This is shown in some detail in Fig. 3B of the drawings, which is a partial cross-sectional view of Fig. 3A along the line indicated by the arrows. The pressure with which the spherical member 25 is held in contact with the recording surface of the sleeve 11 is controlled by the spring 24 mounted in a centrally located hollow vertical slot in the lower portion of housing 21. Contact between the electrical conductor 34 and the spherical contacting member 25 is made by a conducting rod 25*a* drawn axially through the spring 24 and having a brush ending terminating on the member 25. Guide rods 26 and 27, upon which the slots 28 and 29, respectively, of housing 21 ride, are mounted in the supporting members 15 and 16 parallel to and on opposite sides of the threaded rod 22. This arrangement operates to prevent rotation of the housing 21 with the rod 22, and to further constrain the motion of the sphere 25 in the desired path. Both the threaded rod 22 and the drum 10 are simultaneously driven to rotate by the motor 30, which is connected through a worm gear reducing mechanism in the gear box 31 to rotate the threaded rod 22, and through meshed reducing gears in gear box 31 and the external reducing gears 32 and 33 and shaft 13*a* to rotate the drum 10 about its longitudinal axis. The respective gear ratios are chosen so that, by way of typical example, housing 21 is advanced toward the right by one-thousandth of an inch during the time required for drum 10 to complete one revolution.

The electrical connections to the recording and reproducing assemblage just described are made to the spherical contact 25 through the lead 34 mentioned above, and through a second lead 35 which terminates in a brush riding on the socket at the right end of drum 10.

Figure 3A:
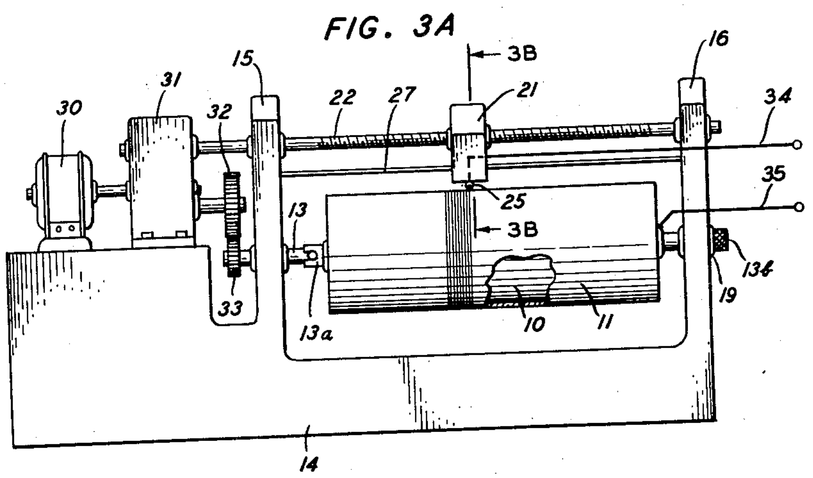
Figs. 3A and 3B illustrate, respectively, a side elevation and a partial cross-sectional view of a rotating drum arrangement to be utilized either in combination with the recording circuit shown in Fig. 4, or the reproducing circuit shown in Fig. 6.
Figure 3B:
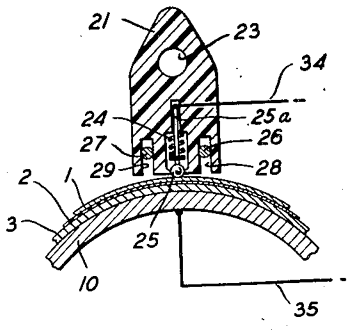
Figure 4:
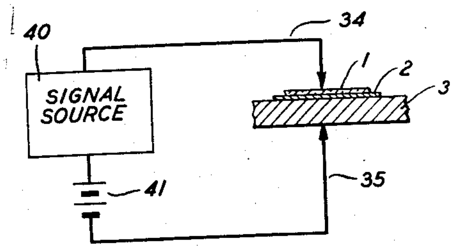
Fig. 4 is a schematic showing of a simple circuit for signal recording.

Fig. 4 indicates in schematic diagram form an electrical circuit for recording signals in accordance with the present invention. Although it will be appreciated that the mechanical recording operation can be carried out by any of a variety of mechanisms and techniques well known in the art, for convenience of illustration it will be assumed that this function is performed by the recording and reproducing mechanism described above with reference to Figs. 3A and 3B.

As indicated in Fig. 4, the contacting leads 34 and 35 respectively connected to the recording surface of the sleeve 11 and the conducting substrate thereof, are connected across a signal source 40 in series with the biasing battery 41. Thus, while rotation of the drum 10 and rod 22 causes the contacting element 25 to execute a helical path over the surface of the recording matrix on the sleeve 11, a record is made in the form of variations in the remanent polarization of the barium titanate film on the sleeve 11 which correspond to the variations in the impressed signals from the source 40.

Figure 5:
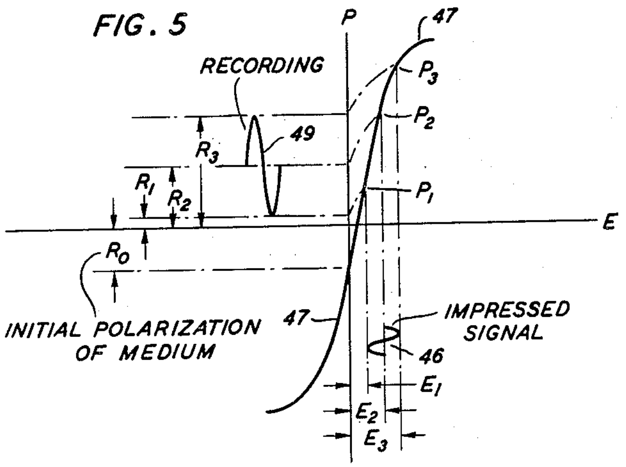
Fig. 5 illustrates graphically the theory of operation of the circuit of Fig. 4.

This operation will be more clearly understood by reference to Fig. 5 of the drawings, which shows a portion of a hysteresis loop 47 which corresponds, for example, to the portion D—B—C of the curve shown in Fig. 1 of the drawings plotted with a vertical axis P representing polarization, and a horizontal axis E representing electrical field. Assume, now, that an impressed signal represented by the curve 46 is applied to the barium titanate recording medium on the sleeve 11. Let us assume also that the signal 46 oscillates between a maximum positive voltage $E_3$ and a minimum $E_1$ through a median value $E_2$, which represents the direct current bias of the source 41 in Fig. 4. For optimum operation, the biasing voltage should be chosen to correspond to the linear portion of the hysteresis loop 47. This approximates half of the saturation voltage, and should be about two kilovolts per centimeter of thickness when a barium titanate evaporated film is used as the recording medium. About five kilovolts per centimeter will be required when a baked-on ceramic layer is used as the medium.

The resultant polarizations produced on the film 1 will vary from point to point between a maximum $P_3$ and a minimum $P_1$ through a midpoint $P_2$. But as the impressed signal field is removed from the immediate vicinity of each successive point, the polarization thereof will decay slightly, leaving a substantially permanent remanent polarization which varies from point to point through the values $R_1$, $R_2$ and $R_3$, as indicated by curve 49. Accordingly, after the recording contact 25 of Fig. 3A has executed its helical path the length of the sleeve 11, there are recorded thereon remanent polarization variations which correspond with the variations in the impressed signal from the source 40.

Figure 6:
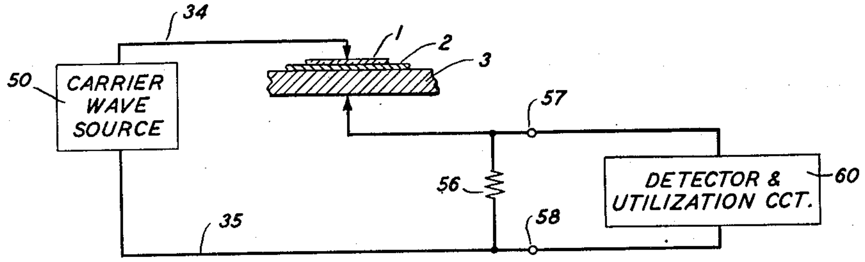
Fig. 6 is a schematic showing of a simple circuit for signal reproduction in accordance with the present invention.

It will also be apparent that the reproducing system indicated in Fig. 6, like the recording system, may utilize any one of a variety of mechanical means for moving the contacting device over the recording medium, as alternative to the system of Figs. 3A, 3B, which is referred to herein by way of illustration.

Referring now to the schematic circuit diagram of a reproducing system shown in Fig. 6 of the drawings, the impressed signal is recovered from the record in the following manner. The cylindrical sleeve 11, bearing a recorded signal, is mounted on the drum of a reproducing mechanism which can be identical to that used for recording, as described above in detail with reference to Figs. 3A and 3B. In the reproducing system, the conducting lead 34 to the surface of the record sleeve 11 is connected to one terminal of a carrier wave source 50; and the other lead 35 to the internal conducting substrate of sleeve 11 is connected through the resistance 56 to the other terminal of the carrier source 50. The signal modulated carrier wave output is derived across the terminals 57 and 58. Resistor 56 represents schematically the impedance of any suitable type of utilization circuit for the reproduced signals to which terminals 57 and 58 are connected. Such a utilization circuit will, of course, include a detector for recovering the modulation from the carrier wave, as is well known to those skilled in the art. A number of possible detecting arrangements will be described hereinunder.

Figure 7:
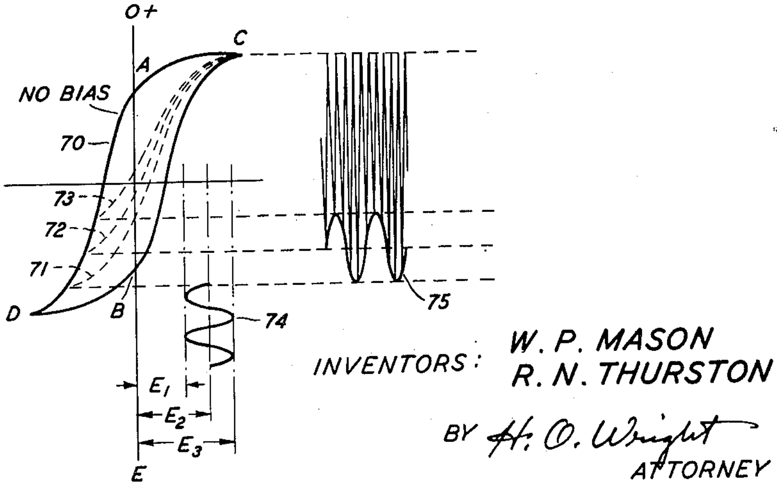
Fig. 7 illustrates graphically the theory of operation of the circuit of Fig. 6.

For a better understanding of the functioning of the circuit of Fig. 6, reference is made to Fig. 7 of the drawings, which shows a hysteresis loop 70 which is similar to the hysteresis loop CADBC described with reference to Fig. 1 of the drawings. This curve is representative of the zero bias condition in which only the carrier is applied to a barium titanate medium, no signals having yet been applied. Assume, now, that a positive potential bias $E_1$ were applied in series with the alternating current source 50; then the hysteresis loop would become constricted, particularly in the negative portion thereof, assuming the shape indicated by the dotted curve 71. Similarly, with progressively larger applied biases $E_2$ and $E_3$, the curve becomes progressively more constricted in the negative portions, in accordance with the shapes respectively shown by the dotted lines 72 and 73. Hence, if the signal on the recording medium swings between a minimum value $E_1$ and a maximum value $E_3$ through the median value $E_2$, as indicated, for example, by curve 74, this causes the circuit to operate as if the bias voltage were varied between these points. Hence, the hysteresis characteristic on which the carrier wave operates is caused to vary in form through the shapes 71, 72 and 73. This, in turn, causes a modulation in the applied carrier wave from the source 50, so that the output current derived across the resistor 56 is modulated in accordance with the envelope 75, which is considerably amplified with respect to the impressed signal shown by curve 74.

It will be apparent that any one of a number of different types of circuits well known in the art will function suitably to recover the modulated output from the circuit shown in Fig. 6, as indicated by the detector and utilization circuit 60 connected across the terminals 57 and 58. In accordance with one modification, the detector portion of circuit 60 can assume the form of a large condenser selected to present a low impedance to the carrier, and yet a relatively high impedance to the signal frequency. This replaces the load resistor 56 between the terminals 57 and 58. In this case, the average value of the output current derived across the terminals 57 and 58 takes substantially the form indicated by curve 75 in Fig. 7. Many other devices, including rectifiers and filtering circuits in various combinations, are well known and consequently will readily suggest themselves to those skilled in the art as alternatives suitable for demodulating the carrier output presented across the terminals 57 and 58.

It will be apparent that, in a manner analogous to magnetic recording-reproducing systems, the applied signal may be erased, and the recording medium prepared for reuse by simply applying along the path of the recorded signal, or by brush operation to the entire length of the drum simultaneously, a uniform voltage of opposite polarity to the record, and greater than the coercive force.

As pointed out in the earlier part of the specification, the high fidelity recording performance of the ferroelectric medium herein disclosed, over the entire range from zero to twenty or more megacycles, is such that it is readily adaptable to the recording of large numbers of channels in the carrier frequency, radio frequency, and/or other high frequency bands, and even two or more video signal channels in the video frequency range.

Assume, for example, that it were desired to record the output of a multichannel system such as shown and described in an article entitled "The L3 coaxial carrier system," by R. H. Klie, Bell Laboratories Record, volume XXXII, No. 1, January 1954, pages 1 through 4. A plurality of recording and reproducing heads, or a single head having a plurality of independent contacting members, each functionally similar to head 21 shown in Figs. 3A and 3B of the drawings, can be utilized to respectively record or reproduce different frequency channels simultaneously along the same path on the recording medium. Alternatively, a single, broad-band multichannel output can be recorded or reproduced, using a single recording head.

Recovery of multichannel signals from the aforesaid record can be accomplished by a plurality of reproducing heads of the type 21 indicated in Figs. 3A, 3B, each with associated filters and demodulators selectively responsive to the respective different frequency bands recorded on the same path of the record. Alternatively, a single reproducing head can be used for this purpose, in combination with a plurality of filters and demodulators connected to the output to separate the component frequency channels of the broad-band and demodulate them severally.

It will be apparent to those skilled in the art that certain of the alternative forms disclosed, such as, for example, thin recording tape, might be more suitable from a technical standpoint for the recording of very high frequencies, than the cylindrical drum disclosed herein by way of illustration.

It will be apparent that the principles of the present invention are in no way restricted to the forms disclosed, or even suggested herein by way of illustration. Many and varied applications of the principles and arrangements of the present invention will readily occur to those skilled in the art, such as, for example, the recording of television signals on records which may be used with appropriate reproducing equipment in the home to provide "canned" programs for reproduction in the usual home television receiver.

What is claimed is:

1. In combination with a system for recording and reproducing continuous wave signals, a record comprising a layer consisting of ferroelectric crystalline material not more than a few microns thick superposed on a substrate comprising a metal selected from the pair consisting of platinum and palladium, said record having a remanent polarization pattern along a preselected path on said layer which pattern corresponds to preselected continuous wave signals.

2. A record in accordance with claim 1 in which said ferroelectric material includes a major component of barium titanate.

3. In combination with a system for recording and reproducing complex, broad-band continuous wave signals, a recording medium comprising a layer not more than a few microns thick of ferroelectric material mounted on a conducting base, a recording device for said signals comprising electrical contacting means disposed on the surface of said ferroelectric layer, means for driving said contact means in a predetermined path over said surface, a source of biasing potential, and a source of said signals connected in circuit relationship with said source of biasing potential between said surface contacting means and said conducting base.

4. A combination in accordance with claim 3 wherein said record comprises a layer of barium titanate mounted on a substrate comprising a metal selected from the pair consisting of platinum and palladium.

5. In combination with a record comprising a thin layer of ferroelectric material superposed on a conducting base, said record having a remanent polarization pattern along a preselected path on the surface thereof which corresponds to a preselected complex continuous wave signal, a signal reproducing circuit comprising contacting means disposed on said surface, means for driving said contact means along said path, a source of carrier voltage, means for impressing the voltage of said source between said contacting means and said conducting base, and means in circuit relation with said contacting means, said carrier source and said conducting base for deriving a modulated output carrier current therefrom, as said contacting means is driven along said path, the modulations of which carrier correspond to the complex, continuous wave signals to which said remanent polarization pattern corresponds.

6. A signal reproducing device in accordance with claim 5 in which said means for deriving a modulated output current includes a low-pass filter having sufficient capacity to respond only to variations in the average of said modulated output current.

7. A signal reproducing device in accordance with claim 5 including rectifying means connected in circuit relation with said means for deriving said output current.

8. A signal reproducing circuit in accordance with claim 5 in which said record comprises substantially a single crystalline layer of barium titanate superposed on a conducting substrate consisting of a material selected from the pair including platinum and palladium.

9. In a system for recording and reproducing complex, continuous wave signals, a recording medium comprising a layer not more than a few microns thick of ferroelectric material mounted on a conducting base, a recording circuit for recording said complex continuous wave signals on said medium comprising electrical contacting means disposed on the surface of said medium, means for driving said contacting means in a predetermined path over said surface, a source of biasing potential, and a source of said complex, continuous wave signals connected in circuit relationship with said source of biasing potential between said surface contacting means and said conducting base; and a signal reproducing circuit for recovering the said complex, continuous wave signals recorded on said recording medium, said circuit comprising contacting means constrained to move over the surface of said recording medium along the path of said recorded signal, a source of carrier voltage, means for impressing the voltage of said carrier source between said contacting means and said conducting base, and means in circuit relation with said contacting means, said carrier source and said conducting base for deriving a modulated output carrier current therefrom as said contacting means is driven along said path, the modulations of which carrier correspond to the complex, continuous wave signals from said signal source.

References Cited in the file of this patent

UNITED STATES PATENTS

| | | |
|---|---|---|
| 2,200,741 | Gray | May 14, 1940 |
| 2,698,928 | Pulvari | Jan. 4, 1955 |